P. A. LAWRENCE.

INTERNAL COMBUSTION ENGINE.

APPLICATION FILED JAN. 15, 1919.

Reissued Dec. 9, 1919.

14,766.

2 SHEETS—SHEET 1.

WITNESSES

Oliver H. Holmes

A. L. Kitchin

INVENTOR

P. A. LAWRENCE

BY Munn & Co.

ATTORNEYS

P. A. LAWRENCE.

INTERNAL COMBUSTION ENGINE.

APPLICATION FILED JAN. 15, 1919.

Reissued Dec. 9, 1919.

14,766.

2 SHEETS—SHEET 2.

WITNESSES

Olive W. Holmes

A. L. Kitchin

INVENTOR

P. A. LAWRENCE

BY Munn & Co

ATTORNEYS

UNITED STATES PATENT OFFICE.

PAUL A. LAWRENCE, OF BENSON, NEBRASKA.

INTERNAL-COMBUSTION ENGINE.

14,766. Specification of Reissued Letters Patent. Reissued Dec. 9, 1919.

Original No. 1,235,491, dated July 31, 1917, Serial No. 854,534, filed August 1, 1914. Application for reissue filed January 15, 1919. Serial No. 271,323.

*To all whom it may concern:*

Be it known that I, PAUL A. LAWRENCE, a citizen of the United States, residing at Benson, in the county of Douglas and State of Nebraska, have invented a new and useful Improvement in Internal-Combustion Engines, of which the following is a specification.

My invention relates to that class of engines known as the constant pressure type and is applicable to either two cycle or four cycle operation. A four cycle engine is described, having the characteristics of the hypothetical indicator diagram shown in Figure 4, but this cycle may be modified to secure the characteristic of the diagram Fig. 5, or the mechanism may be so changed after any suitable well known two cycle principle to adapt the engine to two cycle operation.

As the mechanism employed and the mechanical cycle of operation are not essential to the basis of this invention, only one type of mechanism will be described and this has been simplified in order to facilitate understanding and clearness.

The general principles of operation are as follows:

Starting with the piston at the head end of the stroke and with the valve gear in position to admit air into the cylinder, air will be drawn in as the piston advances, and at the return stroke this air will be compressed until it reaches a certain pressure when a valve opens communicating with an air receiver containing air of the same pressure, further advance of the piston forces the air from the cylinder into the receiver with consequent slight rise in pressure. The cylinder clearance is made as small as possible so that nearly all the air is forced into the receiver.

The receiver valve is held open while the piston is passing the dead center and for a portion of the power stroke depending upon the load, and the air which has been forced into the receiver is allowed to return to the cylinder. The instant the piston begins its power stroke, oil is sprayed into the returning air by the oil pump preferably at an accelerating rate (proportional to the rate of piston travel) and burns as fast as it meets the air.

The governor controls the length of time the oil is injected and a pressure regulator on the receiver, the length of time the receiver valve is open. The oil injection always ceases at or before the time the receiver valve is closed and the receiver valve always closes when the receiver pressure has dropped to the value it had when the receiver valve opened, in other words, when all the air which had been forced into the receiver has returned to the cylinder. The receiver is of such a size that the range of pressure is sufficient to properly work the pressure regulator of the receiver, something like 20 or 40 pounds. The above gives rise to an engine having a constant compression under all loads, and a nearly constant pressure of combustion, as shown by the hypothetical diagram Fig. 4. The dotted and solid lines show how the load affects the combustion and expansion lines with a change in load.

The nature of my invention is fully illustrated by the accompanying drawing, though the details of mechanism employed are not essential, but may be of any suitable form to carry out the operation herein laid down.

Referring to the drawing.

Figure 2:
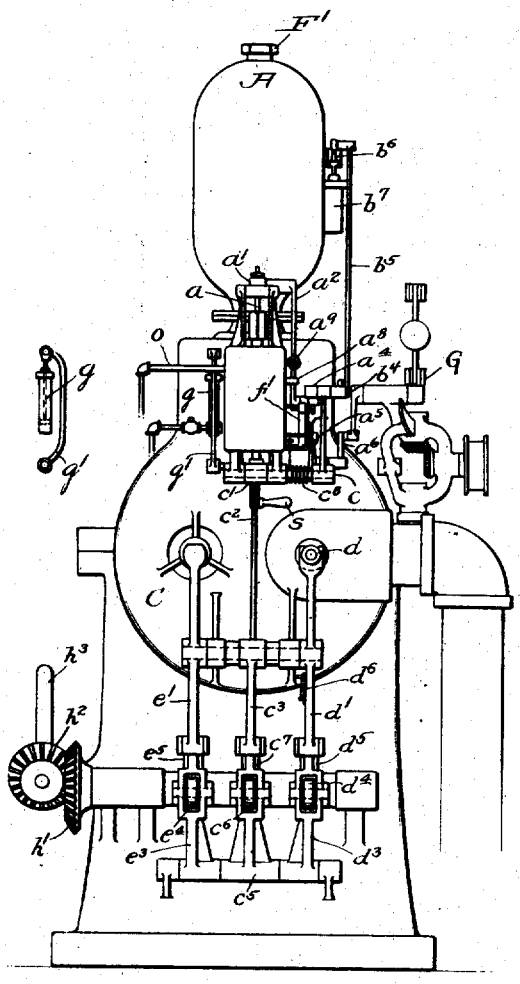
Fig. 2 is a rear elevation of Fig. 1.

Similar letters and figures correspond to the same parts in the different views. The method of designating the parts is in groups of letters combined with numbers, thus the "$a$" group ("$a$," "$a^1$," "$a^2$," "$a^3$," "$a^4$," etc.) refer to the oil pump and its connections; the "$b$" group to the air receiver valve and its connections; the "$c$" group to where the "$a$" group and "$b$" group join and are both actuated by the mechanism common to both, the "$d$" group the exhaust valve and its connections; the "$e$" group to the air intake valve and its connections; the "$f$" group to the spark plug and connections; the "$g$" group to the oil supply pump to draw the oil from a distant source and supply the small tank "D" with oil; the "$h$" group refers to the cam shaft and connections.

The rear part of the engine only is shown, the forward part, consisting of any suitable crank shaft, supported on proper bearings and carrying a bevel gear, keyed to the crank shaft and meshing into a bevel gear keyed on the forward end of the diagonal shaft "$h^3$," which is also supported by a proper bearing at each end. A centrifugal governor G driven from the crank shaft by belt or gearing is preferably so connected to the rod "$a^6$" that it will move it forward with an increase of speed and backward with a reduction in speed. A connection rod connects the crank shaft and piston "E," which works in the cylinder "B." The length of the rod is such that the piston comes quite close to the cylinder head "C" when at the inner dead center or, in other words, the clearance is made as small as is practically possible.

An air chamber "A" is mounted near the cylinder head and communicates with the cylinder by means of a passage. This passage is closed by a valve "$b$," placed nearest the air chamber. As shown, the chamber "A" has approximately such a volume that by receiving the quantity of compressed air between the point "$b$," Fig. 4, of the compression stroke and the end of the compression stroke, the pressure rises about fifteen per cent. The volume swept over by the piston between these points is approximately seven per cent. of the total cylinder volume swept by the piston and accordingly tihs seven per cent. of the cylinder volume bears the same proportion to the volume of the air chamber as the increase in pressure or fifteen per cent. bears to the total pressure of one hundred and fifteen per cent. However, it is, of course evident that this chamber could be larger or smaller without departing from the spirit of the invention and the passageway between the cylinder "B" and the air chamber "A" could be larger or smaller according to circumstances. Varying the size of the passageway varies the size of the clearance space behind the piston, and consequently the volume of compressed air delivered to the air chamber, that is, more air remains as dead air in the cylinder when the passage is large than when it is small.

It is also evident that when the clearance is large a considerable excess of fuel oil may be injected at the beginning of the combustion period in order to, in a large part, combine with the dead air in the clearance space and in that case the fuel injection is not proportional to the rate of piston travel.

These factors all have a determining element in the economy and purposes for which the engine is to be used, a large air chamber and small clearance are desirable features for purposes of economy but not always attainable.

The size of the air chamber determines the slope of the admission line, that is, the larger the air chamber the more constant will be the pressure during the combustion, which is the equivalent to the admission line of a steam engine. The effect of a small air chamber is to lower the economy of the engine just the same as the downward sloping line in a steam engine lowers its economy, but it does not alter the operating principle of the engine in any way. In some instances it is desirable to use a small air chamber notwithstanding the lack of economy.

This valve is of the disk or puppet type and has a cushioning piston at the other end of its stem to prevent slamming. Two collars near the middle of the stem serve to connect it with the arm "$b^1$," which is keyed to the shaft passing through a stuffing box to the outside, where another arm, "$b^2$," is keyed. The spring "$b^9$" closes the valve.

In the passage between the valve "$b$" and the cylinder is an opening for the injection of oil. This opening is closed by a valve "$a^7$," held to its seat by a spring. The oil pump plunger "$a$" on descending, forces the valve "$a^7$" to open both against the tension of the spring and the pressure of the air in the air passage and drives a thin circular sheet or spray of oil into the said passage. When the oil pump plunger "$a$" ascends it draws in a fresh supply of oil from the oil tank "D" through a small ball check valve and passage. The top of the air chamber "A" has an opening closed by the thin metal plate "F" held in place by the gland nut "$F^1$," packing being inserted to make the same tight. This combination is intended as a relief by breaking the metal plate should there be a dangerous increase of pressure from any cause.

"$e$" is the air intake valve held to its seat by the coil spring mounted on its stem. "$d$" is the exhaust valve held to its seat by the spring "$d^6$."

"$h$" is the cam shaft driven from the shaft "$h^3$" by means of the bevel gears "$h^2$" and "$h^1$" and rotates at one-half the speed of the crank shaft. The cam shaft carries three cams "$e^5$," "$c^7$" and "$d^5$."

Cam "$e^5$" through the mechanism "$e^4$," "$e^3$," "$e^2$" and "$e^1$" actuates the air intake valve "e." Cam "$d^5$" through the mechanism "$d^4$," "$d^3$," "$d^2$" and "$d^1$," actuates the exhaust valve "d." Cam "$c^7$" through the mechanism "$c^6$," "$c^5$," "$c^4$" ("$c^4$" being obscured by the rod "$d^2$" is not shown in the drawings), "$c^3$," "$c^2$," and "$c^1$," actuates the lever "c" which has attached to it two pawl rods "$a^4$" and "$b^4$." "$a^4$" engages the pin "$a^3$" and operates the toggle "$a^2$" which in turn actuates the oil injection pump "a" through the arm "$a^1$."

The rod "$a^4$" is disengaged from the pin "$a^3$" by coming in contact with the curved arm "$a^5$" controlled by the governor through the rod "$a^6$"; the position of "$a^5$" determines the point at which the injection of fuel is cut off. The toggle "$a^2$" is drawn back against the stop "$a^8$" by the spring "$a^9$" as soon as the pawl rod "$a^4$" is unhooked from the pin "$a^3$" by the arm "$a^5$."

The pawl rod "$b^4$" also operated by the lever "c" engages the pin "$b^3$" and operates the air receiver valve "b" through the arm "$b^2$," "$b^1$," and the connection shaft.

"$b^7$" is a small cylinder connected to the air chamber "A" by means of an open port near the bottom of the cylinder. In this cylinder is fitted a piston "$b^{10}$" with a coil spring "$b^{11}$" placed on top of it, and held down by the cap through which the rod passes. The rod connects to the rocker arm "$b^6$."

Air from the chamber "A" is free to pass through the port to the underside of the small piston in the cylinder "$b^7$," and forces the piston "$b^{10}$" to rise against the tension of the spring with every increase in pressure in the chamber "A," and to descend by reason of the opposing force of the spring with every reduction of pressure in the chamber "A." The piston in the cylinder "$b^7$" in moving up and down in response to variations of pressure in the receiver "A" oscillates the lever "$b^6$" and raises and lowers the rod "$b^5$." The pin "$b^8$" projects from and is secured in the pawl rod "$b^4$," and works in the slot at the end of "$b^5$." With a reduction in pressure in the air receiver "A" the rod "$b^5$" ascends until the lower end of the slot comes in contact with the pin "$b^8$" and carries the pawl rod "$b^4$" with it, thus disengaging it from the pin "$b^3$," and allowing the spring "$b^9$" to close the air receiver valve "b," thereby preventing further reduction of pressure in the air receiver "A."

The ignition apparatus "f," "$f^1$," and "$f^2$" is used only in starting while the engine cylinder is cold. These ignition parts are connected to an ordinary jump spark coil and battery "f" is connected to the coil circuit and "$f^1$" and "$f^2$" in the battery circuit.

When "$f^1$" comes in contact with "$f^2$" the battery circuit is completed and a series of sparks issue between the points of the spark plug "f." "$f^1$" is formed of a spring and is forced out of contact with "$f^2$" by the toggle "$a^2$."

The spring "$c^8$" is for the purpose of returning the arm "c" and keeping the roller "$c^6$" in contact with the cam "$c^7$."

Figure 1:
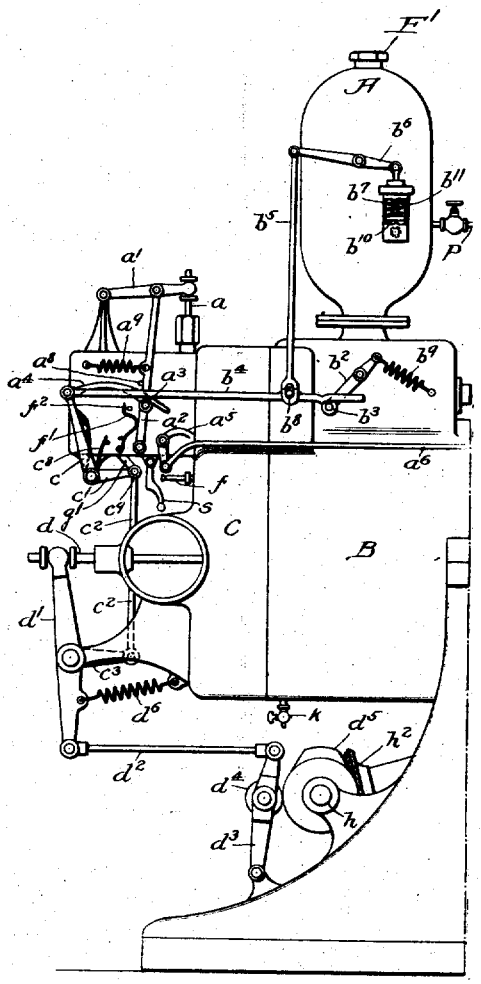
Fig. 1 is a side view of the rear part of the engine, showing the features of my invention, the front part being not unlike that of an ordinary gasolene engine.
Figure 3:
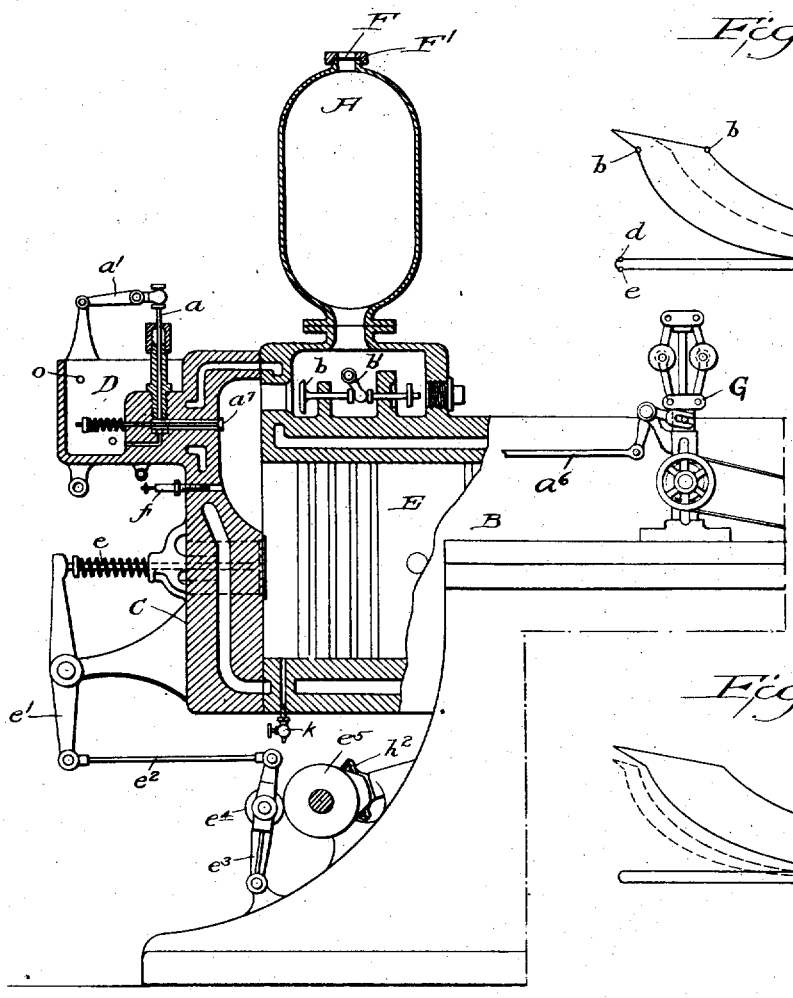
Fig. 3 is a sectional view through the middle of the cylinder, air receiver and oil pump, and has the exhaust valve mechanism and the oil and air mechanism cut away, leaving only the intake cam, cam arm, connecting rod and rocker arm, which actuates the intake valve.

The pump "g" is operated through the connecting rod "$g^1$" by an extension of the pin "$c^9$," Fig. 1, and keeps the tank "D" full of oil, the surplus oil being returned to the supply tank through the overflow pipe "o."

The pipe "p" leads to a small air tank into which air has been compressed by the engine while running on inertia in the act of shutting down.

The lever "s" is the starting and stopping lever and operates by engaging the arm "$c^1$" and holding it down against the tension of the spring "$c^8$". This keeps the arm "c" in a forward position and prevents the rods "$a^4$" and "$b^4$" from engaging the pins "$a^3$" and "$b^3$" and stops the functioning of the oil pump "a" and receiver valve "b".

Having described the essential working parts of the engine the operation will be understood by describing a complete working cycle, starting with the engine at rest.

The oil chamber "D" is drained of oil and filled with gasolene.

The crank shaft is now turned until it is on the inner dead center and the cycle of operation is in the position where both intake and exhaust valves are closed and the valve "b" about to open. The air cock "k" is for the purpose of relieving the compression while putting the engine in this position.

Admit air into the air receiver "A" by opening the valve in the pipe "p", then close the valve. This fills the receiver "A" with air of the normal working pressure.

The air cock "k" is now closed and the starting lever "s" is pushed forward thus releasing the arm "$c^1$", the spring "$c^8$" promptly forces the "c" group of rods and arms into the position shown in Fig. 1 carrying back the pawl rods "$a^4$" and "$b^4$" to engage the pins "$a^3$" and "$b^3$".

All working parts of the engine are now in position for beginning its first power stroke. By a slight additional movement of the crank shaft the same is turned off the dead center, this throws the arm "c" forward and opens the valve "b", admitting pressure to the piston and driving it forward, it also operates the pump "a" injecting the fuel. At the same instant by the movement of the toggle "$a^2$" the spring "$f^1$" comes in contact with the stud "$f^2$" completing the battery circuit and causing sparks to issue at the spark plug "f" igniting the mixture as it enters the cylinder. This action continues until the piston has arrived at approximately one quarter or one third of its outward stroke, at which point the pressure in the chamber "A" has been lowered to such an extent that the pressure regulator "$b^7$" has raised the rod "$b^5$" to a height that the pin "$b^8$" strikes the bottom of the slot in the rod "$b^5$" thus raising the rod "$b^4$" out of contact with the pin "$b^3$," allowing the valve "$b$" to close. At the same instant "$a^4$" comes in contact with "$a^5$," releasing it from the pin "$a^3$," allowing the toggle "$a^2$" to fly back, stopping the injection of oil or gasolene and breaking the battery circuit. The piston now continues under the expansion force of the gases, the pressure falling correspondingly. At the point "$d$" Fig. 4 the exhaust valve opens and upon the inward stroke of the piston the exhaust gases are forced out. As the clearance between the cylinder head and piston is reduced to the smallest practical value the cylinder is completely emptied of the exhaust gases.

Figure 4:
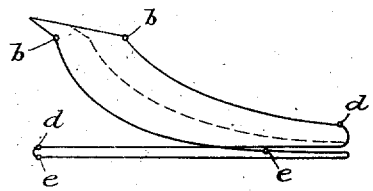
Fig. 4 represents a diagram or indicator card drawn to show the action of the gases in the cylinder of the engine described.

Upon the second outward stroke of the piston, air is drawn into the cylinder through the valve "$e$." The cam "$e^5$" is so formed that the valve "$e$" is held open for a part of the following inward stroke thereby allowing some of the air which was drawn into the cylinder to pass out again through the open valve "$e$," the object of this being to secure a more complete expansion of the gases during the working stroke. At the point "$e$," Fig. 4, the valve "$e$" closes and the further inward motion of the piston is accompanied by an increase of pressure until the point "$b$" in Fig. 4 is reached.

At this point the pressure in the chamber "A" is the same as the pressure behind the piston so that further motion of the piston forces the air from the cylinder into the air chamber. By the time the piston has reached the end of its stroke and all the air except that in the clearance space has been forced into the air chamber, the pressure in the chamber has been raised slightly. This rise in pressure drives up the small piston of "$b^7$" thereby lowering the rod "$b^5$" so that "$b^4$" can engage the pin "$b^3$." The rod "$a^4$" is also engaged with the pin "$a^3$" and all the mechanism is now in position to begin the second cycle of operation.

The amount of oil injected depends on the position of the governor and is independent of the action of "$b$", "$b^7$" and their connections, but the length of time the valve "$b$" is open is indirectly dependent on the amount of oil injected. If much oil is injected the pressure in the air chamber will not fall so rapidly as when only a small amount is injected. The mechanism is so adjusted that the oil is injected at an accelerating rate proportional to the rate of advance of the piston and the maximum amount of oil which can be injected is just enough to combine with the air which has been compressed. If the load is light, oil is injected for only a small part of the stroke, however, the valve "$b$" remains open until all the air which has been compressed during the previous stroke has returned to the cylinder. It will be seen that the valve "$b$" is controlled by the pressure in the air receiver "A" and the oil pump "$a$" is controlled by the governor (not shown) through the rod "$a^6$" and the striker "$a^5$".

The only time the valve "$b$" closes simultaneously with the shutting off of the oil is when the engine is under maximum load, at all the lighter loads the oil injection ceases before the valve "$b$" closes. The spark plug need only be in action in starting the engine, and gasolene is only used in starting. As soon as all parts have become sufficiently heated the heat of compression for all compressions of over one hundred and fifty pounds together with the heating action of the cylinder walls is all that is required to ignite the oil on entering the cylinder.

The size of the air chamber "A" bears the proper ratio to the size of the cylinder so that the required change of pressure takes place in it for operating the unlocking mechanism of the valve "$b$".

The pressure employed in the chamber "A" and which constitutes the maximum pressure in the cylinder may be such as to best meet the mechanical requirements of construction. Moderate pressures, between 200 and 300 pounds are contemplated but the pressure may be carried up to the limits set by mechanical construction.

The form of the air chamber should be such that the air which is forced into it from the cylinder will remain apart from the cooler air in the body of the chamber in as far as this is possible.

To stop the engine draw back the starting lever "$s$" when the arm "$c^1$" is down which will cause it to catch the arm "$c^1$" and hold it and all parts connected with it from being returned by the spring "$c^8$". This prevents the pawl rods "$a^4$" and "$b^4$" from engaging the pins "$a^3$" and "$b^3$" and the engine now works as an air compressor, drawing air in through the valve "$e$" and discharging it through the valve "$b$" which now acts as a check valve. The valve in the pipe "$p$" is now opened and while the engine is losing its inertia, air is compressed and forced into a separate air tank to be used in starting.

It will be noted that the construction permits the engine to be started easily by the use of compressed air, which air is provided by the engine itself during the regular operation, or during the period when the engine is being stopped. This air is used not only in starting but in carrying excessive overload of short duration during the regular operation of the engine. The ease of starting naturally follows from the normal operation of the machine. As the valve mechanism normally holds the air chamber valve open for a portion of the power stroke it follows that if the engine is at rest and the moving parts are in position in the proper cycle to begin the power stroke, simply admitting air from the air storage tank will cause it to start on air and even run on air as long as the storage capacity admits thereof without any fuel being injected. When the engine is being operated normally without carrying an overload, if the valve in pipe "*p*" which leads to the air storage tank (not shown) be slightly open and the pressure in the storage tank is lower, air will slowly flow into the storage tank, the engine acting in the meantime as its own compressor.

It will be observed that when the engine is not operating at a maximum load the piston supplies more air to the air chamber "A" than is actually required to combine with the fuel on the power stroke. This surplus air returns to the cylinder as excessive air, and if a portion of it is allowed to escape to the storage tank a slightly additional amount of fuel will be injected to make up the loss of potential energy carried away by the air to the storage tank. On the other hand, if the engine is operating on an extremely fluctuating load it can draw from the air storage tank during the excessive overload and replenish the tank on light loads. It will thus be observed that a large storage tank admits of carrying a larger overload for a short duration of time than is possible without it.

Figure 5:
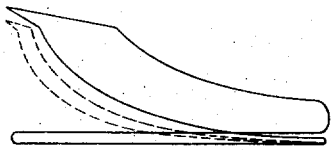
Fig. 5 is also a drawn indicator card of a modification of the method of controlling the air supply and combustion in the cylinder and is given to illustrate how the valve gear and governor control may be modified without changing the essential features of the invention.

A modification of the characteristics of this engine is shown diagrammatically in Fig. 5. Here the governor controls the time of closing of the air intake valve "*e*," regulating the amount of air retained in the cylinder. At heavy loads the amount of air retained is greater than at light loads. The air receiver valve closes simultaneously with the cessation of fuel injection, resulting in complete combination at all loads of all the air and fuel injected. The distinctive feature between this engine and that described heretofore and the characteristics of which is represented diagrammatically by Fig. 4 is that both the air and oil are regulated while in the engine represented by Fig. 4 the fuel only is regulated, the amount of air compressed always remaining unchanged for all loads.

The solid lines in Fig. 5 represent a hypothetical indicator diagram at a very heavy load of the engine, while the dotted lines represent a very light load.

I am aware that internal combustion engines have been built on the constant pressure principle employing a separate compressor; or using one side of the piston for a compressor and the other side for the working side; also engines of the Diesel type compressing air in the working cylinder and injecting the oil with an oil pump or by means of compressed air compressed by a separate air compressor. I, therefore, do not claim any of the methods used by these engines in operating upon a similar thermal cycle.

What I claim as new and desire to secure by Letters Patent is:

1. In an internal combustion engine, having essentially a cylinder, a crank shaft and a piston traveling close in to the cylinder head and compressing air on the inward stroke which was drawn in on the preceding outward stroke or delivered to it in two cycle operation; the combination therewith of an air chamber closed by a valve, said air chamber containing compressed air of a pressure but slightly less than the highest working pressure of the engine, and of such a size that the pressure is only slightly increased by receiving the entire charge of air compressed by the inward motion of the piston, connected to the cylinder by a passage beyond the innermost travel of the piston, into which the fuel is injected on the following outward stroke.

2. In an internal combustion engine, having essentially a cylinder, a crank shaft, a piston traveling close in to the cylinder head, and an air chamber containing compressed air connected to the cylinder by a passage beyond the innermost travel of the piston; the combination therewith of a valve at the opening of the air chamber into said passage, which opens when the pressure in the cylinder becomes higher than the pressure in the air chamber and closes when the pressure in the air chamber drops a definite amount.

3. In an internal combustion engine, a cylinder, a crank shaft and a piston traveling close in to the cylinder head and compressing air on the inward stroke which was drawn in on the preceding outward stroke or delivered to it in two cycle operation; an air chamber closed by a valve, said air chamber containing compressed air of a pressure lower than the highest working pressure of the engine, and which receives the air compressed and delivered by the inward motion of the piston and returns it on the following outward stroke, connected to the cylinder by a passage beyond the innermost travel of the piston, into which the fuel is injected on the following outward stroke.

4. In an internal combustion engine, a cylinder, a crank shaft, a piston traveling close in to the cylinder head, an air chamber containing compressed air of a pressure but slightly less than the highest working pressure of the engine and of such a size that the pressure is only slightly increased by receiving the entire charge of air compressed by the inward motion of the piston, a passage connecting said air chamber with the cylinder beyond the innermost travel of the piston and a valve to close and open said air chamber; a fuel oil pump for injecting fuel into said passage at an accelerating rate proportionate to the rate of piston travel of the engine and controlled by the governor so that the fuel injection is cut off at different points of the stroke of the engine.

5. In an internal combustion engine, a cylinder, a piston arranged in said cylinder, a crank shaft connected with the piston, an air inlet valve arranged in the end of said cylinder opening inwardly whereby when the piston moves on the intake stroke air will be drawn into the cylinder, a compressed air chamber adjacent the cylinder, means forming a passageway between the cylinder and said chamber, said means including a spring pressed valve, means for injecting fuel on the explosion stroke, and means for directing the exhaust to a discharge point.

6. In an internal combustion engine of the character described, a cylinder, an air chamber arranged adjacent the cylinder, means forming a communication between the air chamber and the cylinder, a spring pressed valve normally closing said passageway, said valve facing toward the cylinder, an air inlet valve arranged in the end of the cylinder for permitting air to enter the cylinder when the piston is moving on the intake stroke, said last mentioned valve closing and the first mentioned valve opening on the compression stroke, whereby said air will enter said chamber, means actuated by the air pressure in the air chamber for maintaining the first mentioned valve open when the pressure in the chamber has increased beyond a certain pressure whereby air from the chamber will pass into the cylinder on the explosion stroke of the piston, means for directing fuel into the passageway between the air chamber and the cylinder for part of the explosion stroke, and means for directing the exhaust from said cylinder.

7. In an internal combustion engine, a cylinder, a crank shaft, a piston traveling close in to the cylinder head, an air chamber containing compressed air positioned to receive the charge of air compressed by the inward motion of the piston, a passageway connecting said air chamber with the cylinder beyond the innermost travel of the piston, a valve to close and open said air chamber, a fuel oil pump for injecting fuel into said passageway, means for connecting said oil pump with the governor of the engine whereby the pump may be regulated by said governor so that the fuel is cut off at different points of the stroke of the engine.

8. In an internal combustion engine having essentially a cylinder, a crank shaft, a piston traveling close in to the cylinder head, an air chamber containing compressed air positioned to receive the air on the compression stroke and allowed to return on the outward working stroke, a valve between the said air chamber and the cylinder which opens when the pressure in the cylinder becomes higher than the pressure in the air chamber and which is held open for a portion of the following outward stroke of the piston, and means for liberating said air chamber valve so that it may act as a non-return valve thereby causing the engine to function as an air compressor.

9. In an internal combustion engine provided with a control, a cylinder, a crank, a piston traveling close in to the cylinder head, an air chamber containing compressed air, means for forming a passageway, said passageway connecting the cylinder beyond the innermost travel of the piston with said chamber, a valve to close and open said air chamber, a fuel oil pump for injecting fuel into said passageway, and means for connecting the oil pump with said governor whereby said pump is controlled by the control so that the fuel injection is cut off at different points of the stroke of the engine.

10. In an internal combustion engine, a cylinder, a piston arranged in the cylinder, an air chamber, means forming a passageway between the end of said cylinder and said chamber, a valve arranged to control the passage of air from said air chamber, means for injecting fuel into said cylinder on the power stroke, means for opening said valve during said power stroke, and means for throwing out of action the fuel injecting means whereby the engine will operate as a compressed air engine.

11. In an internal combustion engine, a cylinder, a crank shaft, a piston arranged in said cylinder for compressing air on the inward stroke which was drawn in on the preceding outward stroke or delivered to it in two cycle operation, an air chamber, a valve opening toward the air chamber, means for normally closing said valve, said air chamber normally containing compressed air, means forming a passageway beyond the innermost travel of the piston between said cylinder and said chamber, and means for injecting fuel on the power stroke.

PAUL A. LAWRENCE.